(No Model.)
C. P. R. SCHROEDER.
BICYCLE LOCK.
No. 599,017.  Patented Feb. 15, 1898.
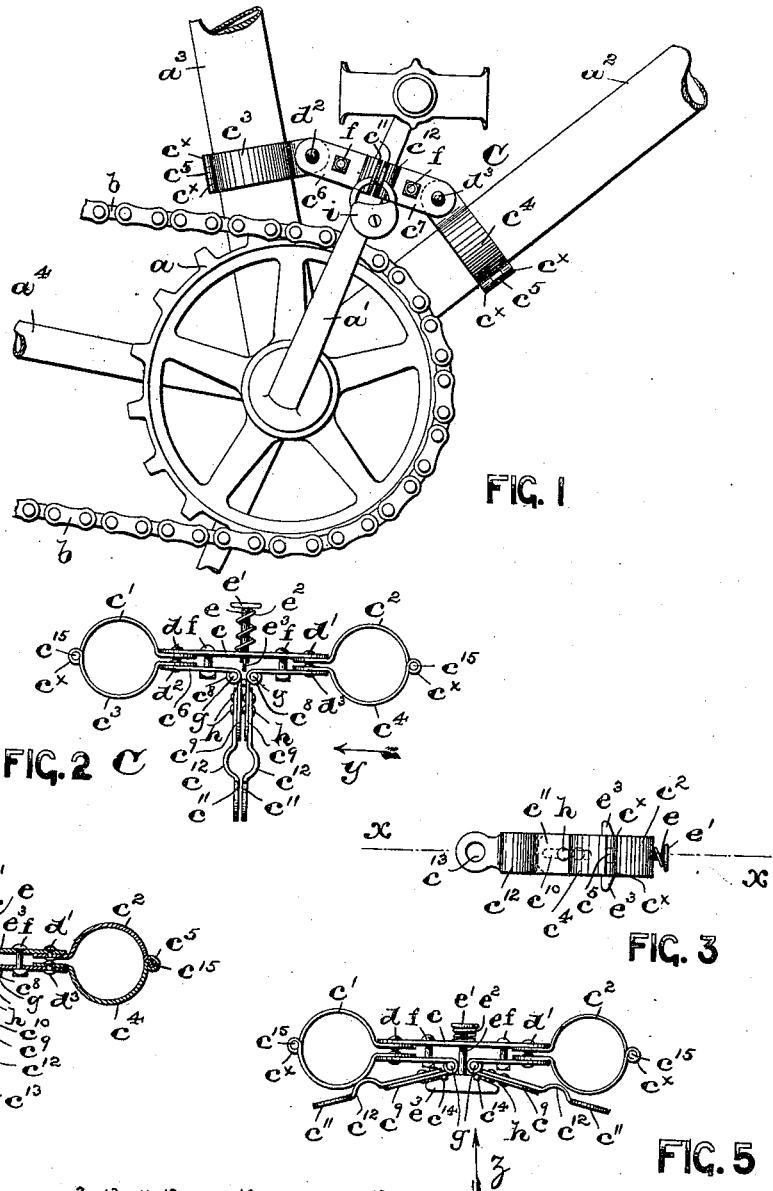
WITNESSES:
Marcy J. Trusdell
Jno. H. Canfield, Jr.
INVENTOR:
CARL P. R. SCHROEDER,
BY
Fred C. Fraentzel,
ATTORNEY

UNITED STATES PATENT OFFICE.

CARL P. R. SCHROEDER, OF HARRISON, NEW JERSEY.

BICYCLE-LOCK.

SPECIFICATION forming part of Letters Patent No. 599,017, dated February 15, 1898.

Application filed November 23, 1897. Serial No. 659,549. (No model.)

*To all whom it may concern:*

Be it known that I, CARL P. R. SCHROEDER, a citizen of the United States, residing at Harrison, in the county of Hudson and State of New Jersey, have invented certain new and useful Improvements in Locking Means for Bicycles, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention is in the nature of an improvement in the locking means for bicycles set forth in my previous Letters Patent No. 589,861, granted to me September 14, 1897; and it consists, essentially, in a means to be used in connection with the movable parts of the locking device, whereby the latter can be permanently attached to the frame of the vehicle and when not in use to engage or lock one of the pedal-cranks to prevent the motion of the driving-chain and the turning of the wheel operated by means of said chain is out of the way of the rotary movement of the pedal-crank.

The invention consists, furthermore, in the several arrangements and combinations of parts, all of which will be hereinafter fully described and finally embodied in the clauses of the claim.

The invention is clearly illustrated in the accompanying drawings, in which—

Figure 1 is a front elevation of my novel form of holding or locking device in position on the frame of the vehicle and illustrating its holding or locking parts in their holding or locked engagement with one of the pedal-cranks of the vehicle. Fig. 2 is a top view of the device when detached from the vehicle, the parts thereof being represented in practically their relative positions when in holding or locked engagement with the pedal-crank of the vehicle. Fig. 3 is a side view of the device looking in the direction of arrow $y$ in Fig. 2; and Fig. 4 is a horizontal section of the device, taken on line $x$ in Fig. 3. Fig. 5 is a plan view of the device, illustrating the relative positions of the parts when the holding or locking parts are disengaged from operative holding contact with the pedal-crank; and Fig. 6 is a view of the device when looking in the direction of the arrow $z$ in said Fig. 5.

Similar letters of reference are employed in all of the above-described views to indicate corresponding parts.

Referring to the drawings hereunto annexed, $a$ indicates the sprocket-wheel on the usual form of crank-shaft in the bottom bracket of a bicycle or other like vehicle, and $b$ indicates the link chain in operative engagement with the sprockets of said wheel. The pedal-cranks of the vehicle are indicated by the reference-letter $a'$, and $a^2$, $a^3$, and $a^4$ are the several portions of the vehicle-frame, which are connected with the bottom bracket in the usual manner.

C indicates my novel form of locking or holding device, which is of the construction illustrated in my said Letters Patent No. 589,861, and is secured to the parts $a^2$ and $a^3$ of the vehicle-frame in the manner set forth in said Letters Patent.

In order to arrive at a better understanding of the construction of the device C in connection with the new features, I will briefly describe the same. Said device consists, essentially, of a flat band or plate $c$, to the opposite ends of which are pivotally secured by means of suitable rivets, pins, or screws $d$ and $d'$ the semicylindrical plates $c'$ and $c^2$, provided with holding loops or eyes $c^\times$. Pivotally arranged between said loops or eyes of the respective plates $c'$ and $c^2$ and on suitable pins $c^{15}$ therein are the holding loops or eyes $c^5$ of a second pair of semicylindrical plates $c^3$ and $c^4$, with which are pivotally connected by means of the rivets, pins, or screws $d^2$ and $d^3$, respectively, the plates $c^6$ and $c^7$. Said main plate $c$ and the plates $c^6$ and $c^7$ are provided with oppositely-placed holes, in which, when the semicylindrical plates $c'$ and $c^3$ and $c^2$ and $c^4$ have been placed about the reaches $a^3$ and $a^2$, respectively, of the the vehicle-frame, are arranged certain bolts or screws $f$, whereby the device C can be securely and permanently fastened in position on the frame of the vehicle. Each plate $c^6$ and $c^7$ has an eye or loop $c^8$, and pivotally connected with certain pins $g$ in said eyes or loops $c^8$ are arms $c^9$, provided with slots $c^{10}$. Slidably and adjustably connected with each arm $c^9$ by means of the pin or pins $h$, movably held and secured in the said slots $c^{10}$, are a second pair of plates $c^{11}$, having the curved parts $c^{12}$, which are adapted to embrace the pedal-crank when the parts are in the positions indicated in Figs. 1 to 4, inclusive, and can be locked in such position by inserting the hasp of a suitable lock $i$ through perforations $c^{13}$ in the ends of said plates $c^{11}$. Thus it will be seen that the device is readily adapted for holding or locking the pedal-crank in a fixed position.

When it is desired to use the wheel, the arms $c^9$ and plates $c^{11}$ are thrown back into the positions indicated in Figs. 5 and 6 and are locked or held in such position by a suitable locking or holding means, which consists, essentially, of a post $e$, rotatively arranged in a hole in the main plate $c$, said post having a head or finger piece $e'$, and $e^2$ is a spring encircling said post $e$ on that part between the said head $e'$ and the exterior surface of the plate $c$. On the opposite end of said post $e$ are a pair of wings $e^3$, which, when the plates or arms $c^9$ and $c^{11}$ are in the positions indicated more especially in Fig. 5, can be brought against the surfaces of said plates or arms $c^9$ and preferably between a pair of studs $c^{14}$ on said arms to hold them owing to the action of the spring $e^2$ in such position, as will be clearly understood. When the arms or plates $c^9$ and $c^{11}$ are to be disengaged from the holding or locked contact with said wings $e^3$, the post $e$ is pushed against the back of the plate $c$, whereby the wings $e^3$ on said post can be turned out of engagement with said studs $c^{14}$, and when the post $e$ is then released by the operator the spring $e^2$ will bring the said wings against the inner surface of the plate $c$, as illustrated in Figs. 2 and 4, and the arms or plates $c^9$ and $c^{11}$ can be turned from the positions indicated in Figs. 5 and 6 to those illustrated in Figs. 2 and 4 to be locked about the pedal-crank of the vehicle.

A cheap, simple, and readily-attachable locking means for bicycles or the like has thus been devised which is neat and ornamental in appearance and when not in use to lock or hold the pedal-crank in a fixed position can be retained in position on the vehicle-frame without interfering with the action of the pedal-crank.

I am aware that changes may be made in the several arrangements and combinations of the parts herein shown and described without departing from the scope of my present invention. Hence I do not limit myself to the exact arrangements and combinations of the parts described in the specification and illustrated in the accompanying drawings.

Having thus described my invention, what I claim is—

1. A locking or holding means for bicycles or the like, comprising a main plate having at each end a clamping portion adapted to embrace the frame portions of the bicycle, a locking or holding means connected therewith and comprising a pair of arms extending at a right angle from said main plate, adapted to be brought in holding or locked engagement with the pedal-crank, and said arms being adapted to be folded against said main plate, and means on said main plate adapted to engage the said locking or holding means and hold it disengaged from the pedal-crank, substantially as and for the purposes set forth.

2. A locking or holding means for bicycles or the like, comprising a main plate having at each end a clamping portion adapted to embrace the frame portions of the bicycle, a locking or holding means connected therewith and adapted to be brought in holding or locked engagement with the pedal-crank, and means on said main plate adapted to engage the said locking or holding means and hold it disengaged from the pedal-crank, consisting, essentially, of a spring-actuated post rotatively connected with said main plate, and wings $e^3$ on said post, substantially as and for the purposes set forth.

3. A locking or holding means for bicycles or the like, comprising a main plate having at each end a clamping portion adapted to embrace the frame portions of the bicycle, a pair of hinged plates or arms connected therewith and extending at a right angle from said main plate, adapted to be brought in holding engagement with the pedal-crank, and said arms being adapted to be folded against said main plate, and a lock for locking said plates or arms fast to said crank, substantially as and for the purposes set forth.

4. A locking or holding means for bicycles or the like, comprising a main plate having at each end a clamping portion adapted to embrace the frame portions of the bicycle, a pair of hinged plates or arms connected therewith and extending at a right angle from said main plate, adapted to be brought in holding or locked engagement with the pedal-crank, and said arms being adapted to be folded against said main plate, and means on said main plate adapted to engage the said hinged plates or arms and hold them disengaged from the pedal-crank, substantially as and for the purposes set forth.

5. A locking or holding means for bicycles or the like, comprising a main plate having at each end a clamping portion adapted to embrace the frame portions of the bicycle, a pair of hinged plates or arms connected therewith and adapted to be brought in holding or locked engagement with the pedal-crank, and means on said main plate adapted to engage the said hinged plates or arms and hold them disengaged from the pedal-crank, consisting, essentially, of a spring-actuated post, rotatively connected with said main plate, and wings $e^3$ on said post, substantially as and for the purposes set forth.

6. A locking or holding means for bicycles or the like, comprising a main plate having at each end a pivotally-arranged clamping portion adapted to embrace the frame portions of the bicycle, a pair of hinged clamping or holding plates or arms connected therewith extending at a right angle from said main plate, adapted to embrace the pedal-crank, and said arms being adapted to be folded against said main plate, a lock connected with said plates for locking them fast to said crank, and means on said main plate adapted to engage with said hinged plates or arms and hold them disengaged from the pedal-crank, substantially as and for the purposes set forth.

7. A locking or holding means for bicycles or the like, comprising a main plate having at each end a pivotally-arranged clamping portion adapted to embrace the frame portions of the bicycle, a pair of hinged clamping or holding plates or arms connected therewith adapted to embrace the pedal-crank, a lock connected with said plates for locking them fast to said crank, and means on said main plate adapted to engage with said hinged plates or arms and hold them disengaged from the pedal-crank, consisting, essentially, of a spring-actuated post rotatively connected with said main plate, and wings $e^3$ on said post, substantially as and for the purposes set forth.

8. The herein-described locking means for a bicycle or the like, comprising, a plate $c$, a pair of semicylindrical plates $c'$ and $c^2$ at each end of said plate $c$, a pair of semicylindrical plates $c^3$ and $c^4$ hinged to said plates $c'$ and $c^2$, a pair of clamping-plates hinged to said plates $c^3$ and $c^4$, and means on said plate $c$ adapted to engage the said hinged plates and hold them disengaged from the pedal-crank, substantially as and for the purposes set forth.

9. The herein-described locking means for a bicycle or the like, comprising, a plate $c$, a pair of semicylindrical plates $c'$ and $c^2$ at each end of said plate $c$, a pair of semicylindrical plates $c^3$ and $c^4$ hinged to said plates $c'$ and $c^2$, a pair of clamping-plates hinged to said plates $c^3$ and $c^4$, and means on said plate $c$ adapted to engage the said hinged plates and hold them disengaged from the pedal-crank, consisting, essentially, of a spring-actuated post rotatively connected with said plate $c$, and wings $e^3$ on said post, substantially as and for the purposes set forth.

10. The herein-described locking means for a bicycle or the like, comprising, a plate $c$, a pair of semicylindrical plates $c'$ and $c^2$ at each end of said plate $c$, a pair of semicylindrical plates $c^3$ and $c^4$ hinged to said plates $c'$ and $c^2$, a pair of plates $c^6$ and $c^7$ connected with said plates $c^3$ and $c^4$, arms or plates $c^9$ connected with said plates $c^6$ and $c^7$, having holding portions adapted to embrace the pedal-crank, a spring-actuated post rotatively connected with said plate $c$, and wings $e^3$ on said post adapted to engage said arms or plates $c^9$ and hold them disengaged from said pedal-crank, substantially as and for the purposes set forth.

11. The herein-described locking means for a bicycle or the like, comprising, a plate $c$, a pair of semicylindrical plates $c'$ and $c^2$ at each end of said plate $c$, a pair of semicylindrical plates $c^3$ and $c^4$ hinged to said plates $c'$ and $c^2$, a pair of plates $c^6$ and $c^7$ connected with said plates $c^3$ and $c^4$, arms or plates $c^9$ connected with said plates $c^6$ and $c^7$, having holding portions adapted to embrace the pedal-crank and adjustably connected with said plate $c^9$, a spring-actuated post rotatively connected with said plate $c$, and wings $e^3$ on said post adapted to engage said arms or plates $c^9$ and hold them disengaged from said pedal-crank, substantially as and for the purposes set forth.

In testimony that I claim the invention set forth above I have hereunto set my hand this 20th day of November, 1897.

CARL P. R. SCHROEDER.

Witnesses:
FREDK. C. FRAENTZEL,
WM. H. CAMFIELD, Jr.